(12) United States Patent
Yamamoto et al.

(10) Patent No.: US 10,533,763 B2
(45) Date of Patent: Jan. 14, 2020

(54) CONTROLLER OF AIR-CONDITIONING SYSTEM AND METHOD FOR CONTROLLING AIR-CONDITIONING SYSTEM

(71) Applicant: Mitsubishi Electric Corporation, Chiyoda-ku (JP)

(72) Inventors: Takaya Yamamoto, Chiyoda-ku (JP); Yoshitaka Uno, Chiyoda-ku (JP); Kiyoshi Maekawa, Chiyoda-ku (JP); Takahiro Nakai, Chiyoda-ku (JP)

(73) Assignee: Mitsubishi Electric Corporation, Chiyoda-ku (JP)

( * ) Notice: Subject to any disclaimer, the term of this patent is extended or adjusted under 35 U.S.C. 154(b) by 248 days.

(21) Appl. No.: 15/505,850

(22) PCT Filed: Sep. 1, 2014

(86) PCT No.: PCT/JP2014/072919
§ 371 (c)(1),
(2) Date: Feb. 22, 2017

(87) PCT Pub. No.: WO2016/035121
PCT Pub. Date: Mar. 10, 2016

(65) Prior Publication Data
US 2017/0268795 A1    Sep. 21, 2017

(51) Int. Cl.
*G05B 21/00* (2006.01)
*G05B 13/00* (2006.01)
(Continued)

(52) U.S. Cl.
CPC .............. *F24F 11/30* (2018.01); *F24F 11/62* (2018.01); *F24F 11/89* (2018.01); *G05B 19/048* (2013.01);
(Continued)

(58) Field of Classification Search
CPC . F24F 11/30; F24F 11/62–11/63; F24F 11/89; F24F 2110/10; F24F 2140/20
(Continued)

(56) References Cited

U.S. PATENT DOCUMENTS 5,247,806 A    9/1993  Ebisu et al.
5,634,590 A    6/1997  Gorski et al.
(Continued)

FOREIGN PATENT DOCUMENTS

JP    4-142 A    1/1992
JP    4-103946 A    4/1992
(Continued)

OTHER PUBLICATIONS

Extended European Search Report dated Apr. 4, 2018 in corresponding European Patent Application No. 14901086.0, 7 pages.
(Continued)

*Primary Examiner* — Md Azad
(74) *Attorney, Agent, or Firm* — Oblon, McClelland, Maier & Neustadt, L.L.P.

(57) ABSTRACT

A controller of an air-conditioning system includes a feedback control unit configured to generate a state quantity command from a control parameter and a difference between a target value of a room temperature and a measured room temperature and control the room temperature to the target value on the basis of the state quantity command, a control target heat characteristic model calculation unit configured to calculate a parameter of a model regarding a heat characteristic of a control target from at least a state quantity regarding an amount of heat supplied to the control target or the state quantity command, and the measured room temperature during normal operation, and a control parameter determination unit configured to determine the control parameter by using the parameter and a formula derived
(Continued)

from the model regarding the heat characteristic of the control target.

11 Claims, 10 Drawing Sheets

(51) Int. Cl.
      *G05D 23/00*     (2006.01)
      *G01M 1/38*     (2006.01)
      *G05B 15/00*     (2006.01)
      *F24F 11/30*     (2018.01)
      *F24F 11/89*     (2018.01)
      *F24F 11/62*     (2018.01)
      *G05B 19/048*     (2006.01)
      *F24F 11/63*     (2018.01)
      *F24F 110/10*     (2018.01)
      *F24F 140/20*     (2018.01)

(52) U.S. Cl.
      CPC ........... *F24F 11/63* (2018.01); *F24F 2110/10* (2018.01); *F24F 2140/20* (2018.01); *G05B 2219/2614* (2013.01)

(58) Field of Classification Search
      USPC ........................................................ 700/278
      See application file for complete search history.

(56) References Cited

U.S. PATENT DOCUMENTS

| | | |
|---|---|---|
| 8,744,631 B2 | 6/2014 | Wang et al. |
| 9,002,526 B2* | 4/2015 | Matsuoka ........... H04L 12/2825 700/276 |
| 2006/0066155 A1* | 3/2006 | Matin ................... H02K 5/136 310/52 |
| 2010/0065245 A1* | 3/2010 | Imada .................... F24F 3/001 165/59 |
| 2011/0166712 A1* | 7/2011 | Kramer .............. G05D 23/1919 700/278 |
| 2012/0253543 A1 | 10/2012 | Laughman |
| 2013/0085614 A1* | 4/2013 | Wenzel .............. G05D 23/1923 700/277 |
| 2015/0316907 A1* | 11/2015 | Elbsat ................... G06Q 10/04 700/275 |
| 2015/0322871 A1* | 11/2015 | Nakada ................ G05B 13/048 701/101 |
| 2016/0109867 A1* | 4/2016 | Wada ..................... G05B 17/02 703/13 |

FOREIGN PATENT DOCUMENTS

| | | |
|---|---|---|
| JP | 6-323595 A | 11/1994 |
| JP | 07-261805 A | 10/1995 |
| JP | 07-332732 A | 12/1995 |
| JP | 2001-221481 A | 8/2001 |
| JP | 2001-350503 A | 12/2001 |
| JP | 2002-257423 A | 9/2002 |
| JP | 2005-172387 A | 6/2005 |
| JP | 2011-214794 A | 10/2011 |
| JP | 2013-139954 A | 7/2013 |

OTHER PUBLICATIONS

Office Action dated Feb. 20, 2018 in Japanese Patent Application No. 2016-546206 (with English language translation), 7 pages.

International Search Report dated Dec. 2, 2014, in PCT/JP2014/072919 filed Sep. 1, 2014.

Combined Chinese Office Action and Search Report dated Nov. 27, 2018 in Patent Application No. 201480081395.0 (with English language translation and English language translation of categories of cited documents).

* cited by examiner

CONTROLLER OF AIR-CONDITIONING SYSTEM AND METHOD FOR CONTROLLING AIR-CONDITIONING SYSTEM

TECHNICAL FIELD

The present invention relates to an air-conditioning system that performs feedback control of a room temperature, and a method for controlling the air-conditioning system, and particularly relates to a method for determining parameters to be used for feedback control.

BACKGROUND ART

As an existing controller of an air-conditioning system, there is a controller including a feedback controller (PID controller) for automatically controlling a predetermined process (see, e.g., Patent Literature 1). The PID controller including the PID controller changes output of the PID controller stepwise within a certain range. At this time, the PID controller identifies parameters (dead time, a primary delay time constant, and process gain) on the basis of output of a control target. Then, the PID controller determines parameters of the PID controller on the basis of a predetermined equation by using the parameters of the control target.

CITATION LIST

Patent Literature

Patent Literature 1: Japanese Unexamined Patent Application Publication No. 2001-350503 (see, e.g., paragraphs [0020] to [0026] and FIGS. 1 and 2)

SUMMARY OF INVENTION

Technical Problem

In Patent Literature 1, in identifying the parameters of the control target, it is necessary to change the output of the PID controller stepwise, so that it is necessary to perform operation that is different from normal operation of the air-conditioning system and is dedicated for parameter identification. In addition, in performing parameter identification, the primary delay time constant of the control target is calculated by using a time taken for the control target to increase to 63% of a final increase amount when the output of the PID controller is changed stepwise, so that it is necessary to wait until the control target reaches the final increase amount when the output of the PID controller is changed stepwise. Therefore, in the air-conditioning system in which the heat capacity of the control target is large, a long time is taken until the parameters are obtained, so that there is a possibility that the comfort is impaired.

In addition, the control target is approximated on the basis of the dead time and the primary delay time constant. Thus, there is a possibility that the identified parameters are greatly different depending on an initial state in changing the output of the PID controller stepwise. Furthermore, a model of the control target is identified from only the output of the PID controller and the output of the control target. Thus, there is a problem that influence of a disturbance such as outdoor air temperature cannot be modeled.

The present invention has been made in consideration of the above-described problems, and an object of the present invention is to provide a controller, of an air-conditioning system, which does not impair comfort even during parameter determination, and a method for controlling the air-conditioning system.

Solution to Problem

A controller of an air-conditioning system according to the present invention includes: a feedback control unit configured to generate a state quantity command from a control parameter and a difference between a target value of a room temperature and a measured room temperature and control the room temperature to the target value on the basis of the state quantity command; a control target heat characteristic model calculation unit configured to calculate a parameter of a model regarding a heat characteristic of a control target from at least a state quantity regarding an amount of heat supplied to the control target or the state quantity command, and the measured room temperature during normal operation; and a control parameter determination unit configured to determine the control parameter by using the parameter and a formula derived from the model regarding the heat characteristic of the control target.

Advantageous Effects of Invention

With the controller of the air-conditioning system according to the present invention, since the parameter of the feedback control unit is determined from data during normal operation, it is not necessary to perform certain dedicated operation in which there is a possibility that the room temperature of the control target deviates from a set target temperature, and it is possible to continuously control the room temperature to the target value even during parameter determination, so that there is an effect that comfort is not impaired even during parameter determination.

DESCRIPTION OF EMBODIMENTS

Figure 1:
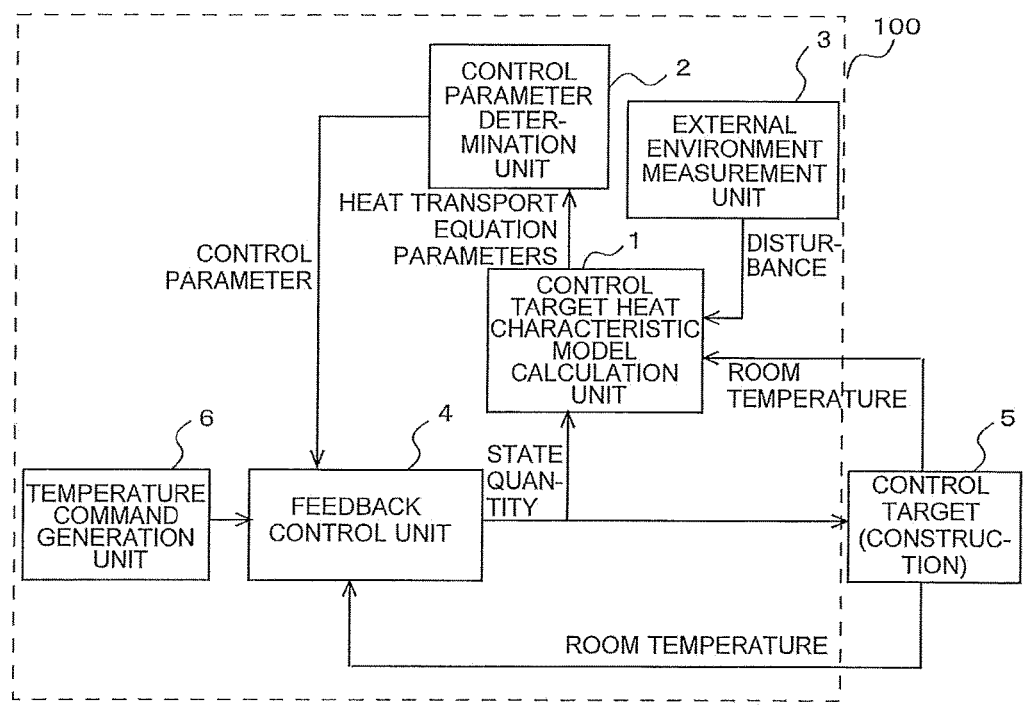
FIG. 1 is a block diagram of a controller of an air-conditioning system according to Embodiment 1 of the present invention.

Hereinafter, Embodiments of the present invention will be described with reference to the drawings. The present invention is not limited to Embodiments described below. In addition, the relationship of the size of each constituent element in the drawings described below may be different from actual relationship.

Embodiment 1

FIG. 1 is a block diagram of a controller 100 of an air-conditioning system according to Embodiment 1 of the present invention.

The air-conditioning system according to Embodiment 1 includes the controller 100, and controls a room temperature of a construction that is a control target 5, by the controller 100.

In Embodiment 1, the control target 5 is assumed to be a house here, but the control target 5 may be another construction, such as a building, a factory, or each room of a house or a building.

As a method for performing air-conditioning of a house, there is a method in which a room air-conditioning device is mounted in some of rooms in the house, and there is a method in which water is boiled by a heat pump or another device provided to the house, the boiled water is sent to a place to be heated, and heating is performed by using a heat radiating device such as a radiator or a fan coil. In addition, there is also a method in which a duct is passed into each room of the house, and warm air or cold air is generated by a heat pump and is sent to each room through the duct, thereby performing cooling or heating.

Embodiment 1 will be described with, as an example, a system (hereinafter, referred to as Air to Water system and abbreviated as ATW system, or referred to as whole-building hot water heating system) in which hot water is generated by a heat pump and is sent to a place to be heated, and heating is performed by using a heat radiating device such as a radiator or a fan coil.

In the ATW system, hot water is generated under control according to a hot water temperature command and is sent to a heat radiating device such as a radiator, and the interior of the house, which is the control target 5, is heated.

The controller 100 of the air-conditioning system includes a control target heat characteristic model calculation unit 1, a control parameter determination unit 2, an external environment measurement unit 3, a feedback control unit 4, and a temperature command generation unit 6.

To the control target heat characteristic model calculation unit 1, a hot water temperature and a flow rate each of which is a state quantity regarding an amount of heat supplied to the house, which is the control target 5, a room temperature within the house, and an outdoor air temperature and an amount of solar radiation that are disturbances measured by the external environment measurement unit 3, are inputted.

In the ATW system, when the flow rate of hot water sent within the house is uniform, the state quantity regarding the amount of heat supplied to the house may be only the hot water temperature.

Heat transport equation parameters are calculated on the basis of the above respective input values and are outputted to the control parameter determination unit 2. The heat transport equation parameters will be described later. The heat transport equation parameters correspond to a "parameter of a model regarding a heat characteristic of a control target" of the present invention.

The control parameter determination unit 2 determines a control parameter on the basis of the heat transport equation parameters inputted from the control target heat characteristic model calculation unit 1, and outputs the parameter to the feedback control unit 4. The control parameter will be described later.

The feedback control unit 4 performs feedback control of a room temperature of the control target 5 on the basis of the inputted information.

The temperature command generation unit 6 outputs, to the feedback control unit 4, a target value (temperature command) of the room temperature that is designated by a remote control, a Home Energy Management System (HEMS), a programmable thermostat, or another device.

Figure 2:
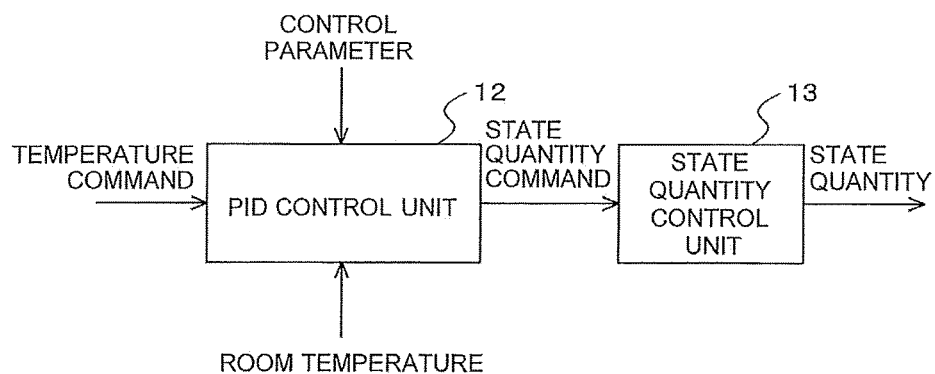
FIG. 2 is a block diagram of a feedback control unit of the controller of the air-conditioning system according to Embodiment 1 of the present invention.

FIG. 2 is a block diagram of the feedback control unit 4 of the controller 100 of the air-conditioning system according to Embodiment 1 of the present invention.

The feedback control unit 4 includes therein a PID control unit 12 and a state quantity control unit 13. The PID control unit 12 performs PID control on the basis of the above control parameter that is a parameter for performing PID control (i.e., a parameter of the PID control unit 12) and the difference between the temperature command (the target value of the room temperature) and a measured room temperature, generates a state quantity command, and outputs the generated state quantity command to the state quantity control unit 13.

P means proportion, I means integration, and D means differentiation. When PI control without differentiation is performed as PID control, the control parameter determination unit 2 determines a control parameter for performing PI control.

Figure 3:
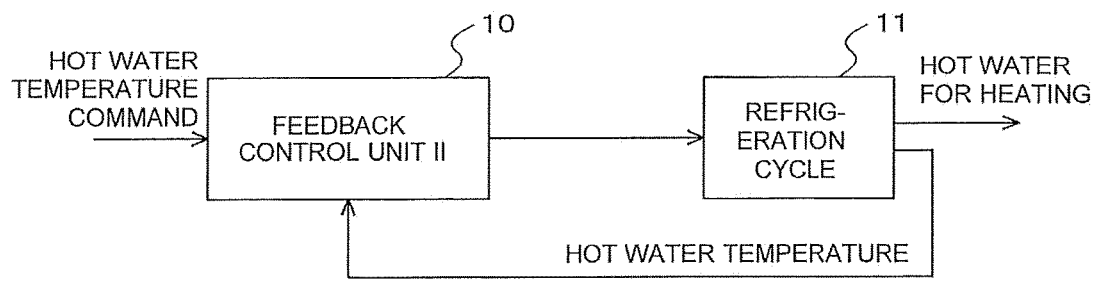
FIG. 3 is a block diagram of a state quantity control unit of the feedback control unit of the controller of the air-conditioning system according to Embodiment 1 of the present invention.

FIG. 3 is a block diagram of the state quantity control unit 13 of the feedback control unit 4 of the controller 100 of the air-conditioning system according to Embodiment 1 of the present invention.

The state quantity control unit 13 includes therein a feedback control unit II 10 and a refrigeration cycle 11. In the case of the NM system, an example of the state quantity command within the feedback control unit 4 is a hot water temperature command as shown in FIG. 3, and the feedback control unit II 10 controls the refrigeration cycle 11 of the heat pump such that hot water corresponding to the hot water temperature command (a target value of the hot water temperature) is generated.

Figure 4:
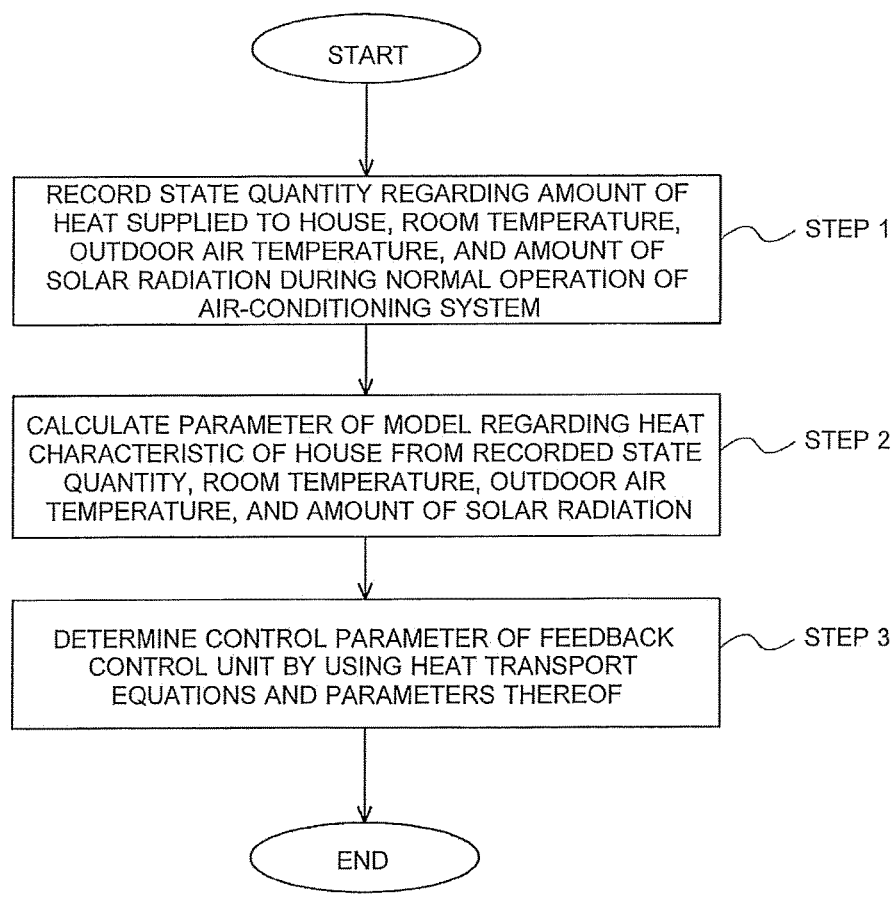
FIG. 4 is a control parameter determination flowchart of the feedback control unit of the controller of the air-conditioning system according to Embodiment 1 of the present invention.
Figure 5:
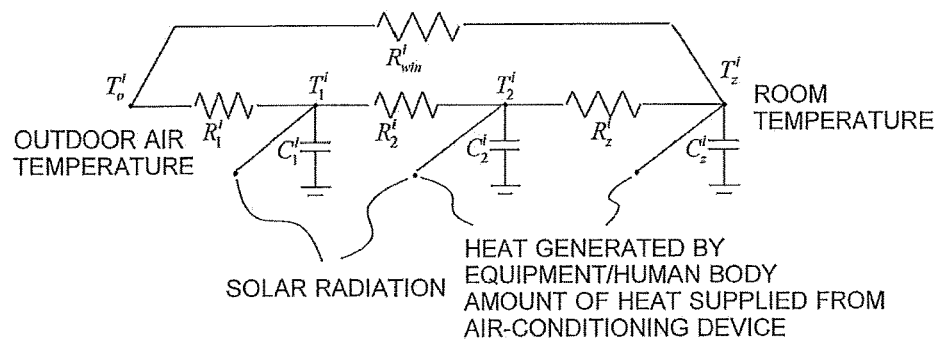
FIG. 5 is a diagram showing a thermal network model Part 1 according to Embodiment 1 of the present invention.

FIG. 4 is a control parameter determination flowchart of the feedback control unit 4 of the controller 100 of the air-conditioning system according to Embodiment 1 of the present invention, and FIG. 5 is a diagram showing a thermal network model according to Embodiment 1 of the present invention.

Hereinafter, control parameter determination flow of the feedback control unit 4 will be described with reference to FIG. 4.

First, a process in step 1 is performed, and during normal operation of the air-conditioning system, the state quantity regarding the amount of heat supplied to the house, the room temperature, the outdoor air temperature, and the amount of solar radiation are recorded in the control target heat characteristic model calculation unit 1 every moment.

When the control parameter of the feedback control unit 4 has never been updated by the control parameter determination unit 2, the feedback control unit 4 is activated with a control parameter that is initially set.

Next, a process in step 2 is performed, the state quantity regarding the amount of heat supplied to the house, the room temperature, the outdoor air temperature, and the amount of solar radiation are recorded for a designated certain period, and then parameters of a model regarding the heat characteristic of the house are calculated from the recorded state quantity regarding the amount of heat supplied to the house, the recorded room temperature, the recorded outdoor air temperature, and the recorded amount of solar radiation.

In Embodiment 1, the thermal network model shown in FIG. 5 is the model regarding the heat characteristic of the house, which is the control target 5. Heat generated by equipment and human body is previously recorded within the control target heat characteristic model calculation unit 1 as a standard value for each house.

At this time, heat transport equations for the house that are formulas derived from the model regarding the heat characteristic of the house are the following formulas (1) to (3).

[Math. 1]

$$C_1^i \frac{\partial T_1^i}{\partial t} = \alpha^i Q_s^i + \frac{T_o^i - T_1^i}{R_1^i} + \frac{T_2^i - T_1^i}{R_2^i} \quad (1)$$

[Math. 2]

$$C_2^i \frac{\partial T_2^i}{\partial t} = \beta^i Q_s^i + (1-\delta^i)Q_{HVAC}^i + (1-\gamma^i)(Q_{EQP}^i + Q_{OCC}^i) + \frac{T_1^i - T_2^i}{R_2^i} + \frac{T_z^i - T_2^i}{R_z^i} \quad (2)$$

[Math. 3]

$$C_z^i \frac{\partial T_z^i}{\partial t} = \delta^i Q_{HVAC}^i + \gamma^i (Q_{EQP}^i + Q_{OCC}^i) + \frac{T_o^i - T_z^i}{R_{win}^i} + \frac{T_2^i - T_z^i}{R_z^i} \quad (3)$$

Here, each superscript i indicates a room number, and i=1 in the ATW system in which whole-building air-conditioning is employed and the house is considered as a single heat characteristic model. In addition, $T_0$ is an outdoor air temperature, $T_1$ is an outer wall outdoor side surface temperature, $T_2$ is an outer wall indoor side surface temperature, $T_z$ is an indoor temperature, $R_1$ is an outer wall outdoor side thermal resistance, $R_2$ is an outer wall thermal resistance, $R_z$ is an outer wall indoor side thermal resistance, $C_1$ is an outer wall outdoor side heat capacity, $C_2$ is an outer wall indoor side heat capacity, $C_z$ is an indoor amount of heat, $Q_s$ is an amount of solar radiation, $Q_{EQP}$ is heat generated by equipment, $Q_{OCC}$ is an amount of heat generated by human body, $Q_{HVAC}$ is an amount of heat supplied from the air-conditioning system to the house, $\alpha$ is a correction coefficient for an amount of solar radiation applied to the outer wall, $\beta$ is a correction coefficient for an amount of solar radiation transmitted into a room, $\gamma$ is a correction coefficient for internally-generated heat, and $\delta$ is a correction coefficient for the amount of heat supplied from the air-conditioning system to the house.

When the state quantity regarding the amount of heat supplied to the house is the hot water temperature and the flow rate, $Q_{HVAC}$=hot water temperature×flow rate. When the state quantity regarding the amount of heat supplied to the house is only the hot water temperature, $Q_{HVAC}$=hot water temperature.

In the control target heat characteristic model calculation unit 1, the heat transport equation parameters composed of $R_1$, $R_2$, $R_z$, $C_1$, $C_2$, $C_z$, $\alpha$, $\beta$, $\gamma$, and $\delta$ that are parameters of the above heat transport equations (1) to (3), or composed of a combination thereof, is calculated by using the recorded hot water temperature and flow rate, each of which is the state quantity regarding the amount of heat supplied to the house, the recorded room temperature, the recorded outdoor air temperature, and the recorded amount of solar radiation. Then, the calculated heat transport equation parameters are sent to the control parameter determination unit 2.

Figure 6:
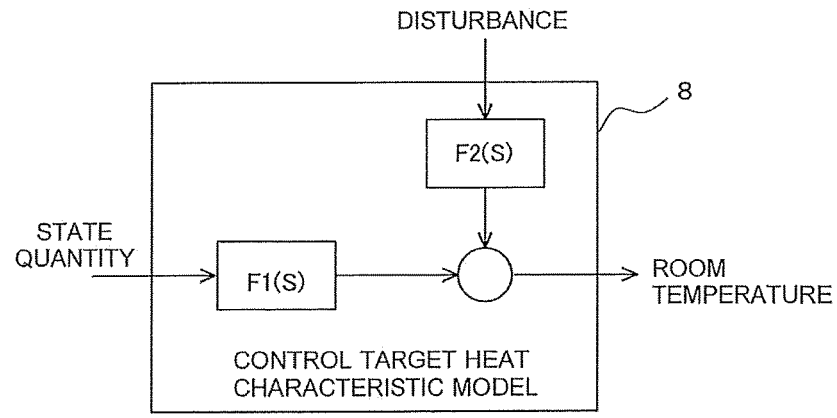
FIG. 6 is a diagram showing a transfer function representation of a control target heat characteristic model according to Embodiment 1 of the present invention.
Figure 7:
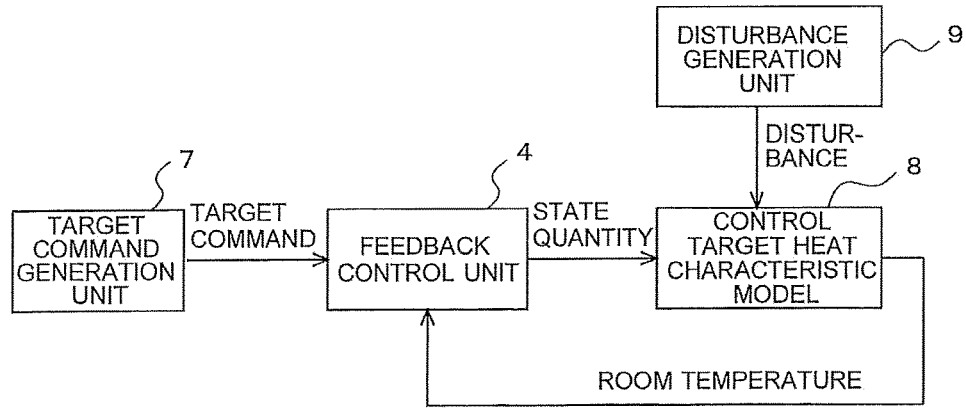
FIG. 7 is a block diagram showing an internal simulator of a control parameter determination unit of the controller of the air-conditioning system according to Embodiment 1 of the present invention.
Figure 8:
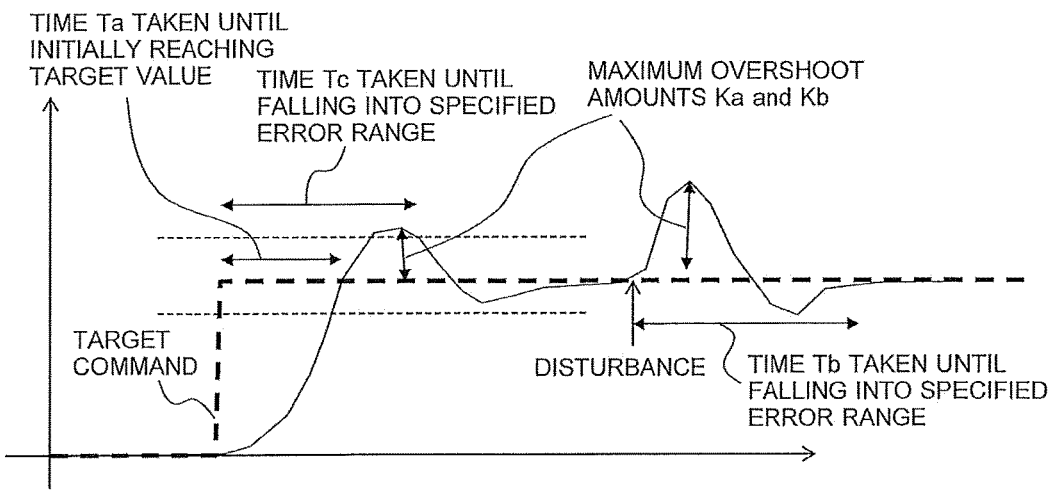
FIG. 8 is a diagram showing an example of output of the internal simulator of the control parameter determination unit of the controller of the air-conditioning system according to Embodiment 1 of the present invention.

FIG. 6 is a diagram showing a transfer function representation of a control target heat characteristic model 8 according to Embodiment 1 of the present invention, FIG. 7 is a block diagram showing an internal simulator of the control parameter determination unit 2 of the controller 100 of the air-conditioning system according to Embodiment 1 of the present invention, and FIG. 8 is a diagram showing an example of output of the internal simulator of the control parameter determination unit 2 of the controller 100 of the air-conditioning system according to Embodiment 1 of the present invention.

Next, the control parameter determination unit 2 performs a process in step 3. The control parameter determination unit 2 determines a transfer function F1(S) from the amount of heat $Q_{HVAC}$ supplied from the air-conditioning system to the house to the room temperature $T_z$, and a transfer function F2(S) from the outdoor air temperature $T_0$ to the room temperature $T_x$ by using the above heat transport equations (1) to (3) and the heat transport equation parameters calculated by the control target heat characteristic model calculation unit 1.

The simulator shown in FIG. 7 using the transfer functions F1(S) and F2(S) of the control target heat characteristic model 8 shown in FIG. 6 is incorporated in the control parameter determination unit 2, and the control target heat characteristic model 8 inputs the state quantity into the transfer function F1(S) and inputs the disturbances into the transfer function F2(S), thereby outputting a room temperature.

In the simulator, simulation in which a stepwise target command from a target command generation unit 7 and a stepwise disturbance from a disturbance generation unit 9 are applied is performed for each combination of the control parameter, while the value of the control parameter of the feedback control unit 4 is changed according to a predetermined rule.

In the simulation, a time $T_a$ taken until initially reaching the target value when the target command changes stepwise as shown in FIG. 8, a maximum overshoot amount $K_a$, a time $T_b$ taken until falling into a specified error range when a stepwise disturbance is applied, and a maximum overshoot amount $K_b$ are calculated. Then, a combination of the control parameter that provides a minimum weighted sum of $T_a$, $K_a$, $T_b$, and $K_b$ is selected as a candidate. $T_c$ taken until falling into a specified error range when the target command changes stepwise may be used instead of $T_a$.

The value of the control parameter selected as the candidate is multiplied by a correction coefficient and then sent to the feedback control unit 4. In the feedback control unit 4, if update of the control parameter is designated by an operator or another person, the control parameter is updated with the value sent from the control parameter determination unit 2 when the controller 100 of the air-conditioning system is turned on again after being turned off.

The control parameter may be changed to the above sent value by using a moving average filter having a previously designated window length.

Figure 9:
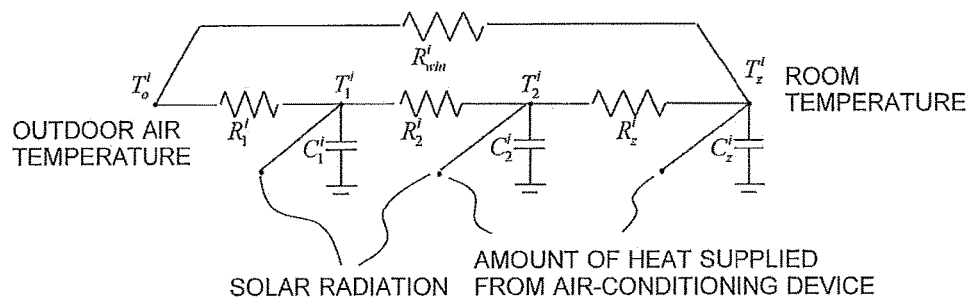
FIG. 9 is a diagram showing a thermal network model Part 2 according to Embodiment 1 of the present invention.
Figure 10:
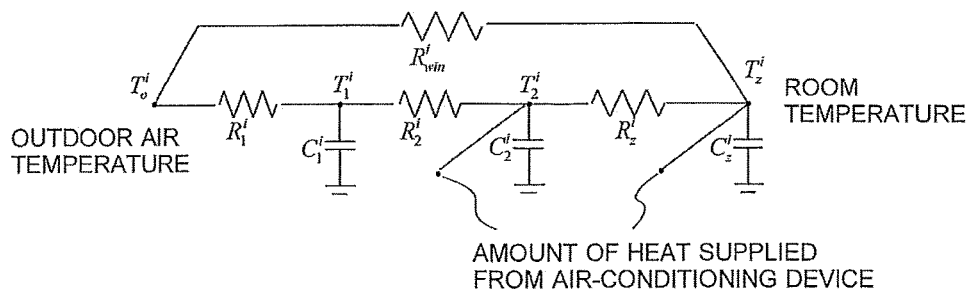
FIG. 10 is a diagram showing a thermal network model Part 3 according to Embodiment 1 of the present invention.

FIG. 9 is a diagram showing a thermal network model Part 2 according to Embodiment 1 of the present invention, and FIG. 10 is a diagram showing a thermal network model Part 3 according to Embodiment 1 of the present invention.

Embodiment 1 has been described with, as an example, the case where heat generated by equipment and human body is taken into consideration. In the house, the ratio of heat generated by equipment and human body is often low and can be neglected in many cases. In such a case, the control target heat characteristic model 8 becomes one in FIG. 9, and in the formulas (1) to (3), the values of $Q_{EQP}$ and $Q_{OCC}$ are always regarded as 0, and calculation is performed.

When solar radiation is also neglected, the control target heat characteristic model 8 becomes one in FIG. 10, and in the formulas (1) to (3), $Q_s$ as well as $Q_{EQP}$ and $Q_{OCC}$ are always regarded as 0, and calculation is performed.

Due to the above, according to Embodiment 1, since the control parameter of the PID control unit 12 within the feedback control unit 4 is determined from data during normal operation of the air-conditioning system, it is not necessary to perform dedicated operation in which there is a possibility that the room temperature of the control target 5 deviates from a set target temperature, and it is possible to continuously control the room temperature to the target value even during control parameter determination, so that there is an effect that comfort is not impaired even during control parameter determination.

Also in a hot water heating system for a house having a large heat capacity, there is an effect that it is not necessary to wait for a long period of time for control parameter determination. In addition, since the model in which the heat characteristic of the control target 5 is explicitly represented is used, there is also an effect that a state when operation data for control parameter determination is collected is less influential.

Since the parameters of the model in which the heat characteristic of the control target 5 is explicitly represented are identified from information of disturbances such as the outdoor air temperature and solar radiation and input and output of the control target 5, there is an effect that it is possible to determine the control parameter in consideration of influence of the disturbances such as influence of the outdoor air temperature or solar radiation, in addition to followability to a temperature set value.

Embodiment 2

Hereinafter, Embodiment 2 will be described. The description of the same parts as in Embodiment 1 is omitted, and parts that are the same as or correspond to those in Embodiment 1 are designated by the same reference signs.

Figure 11:
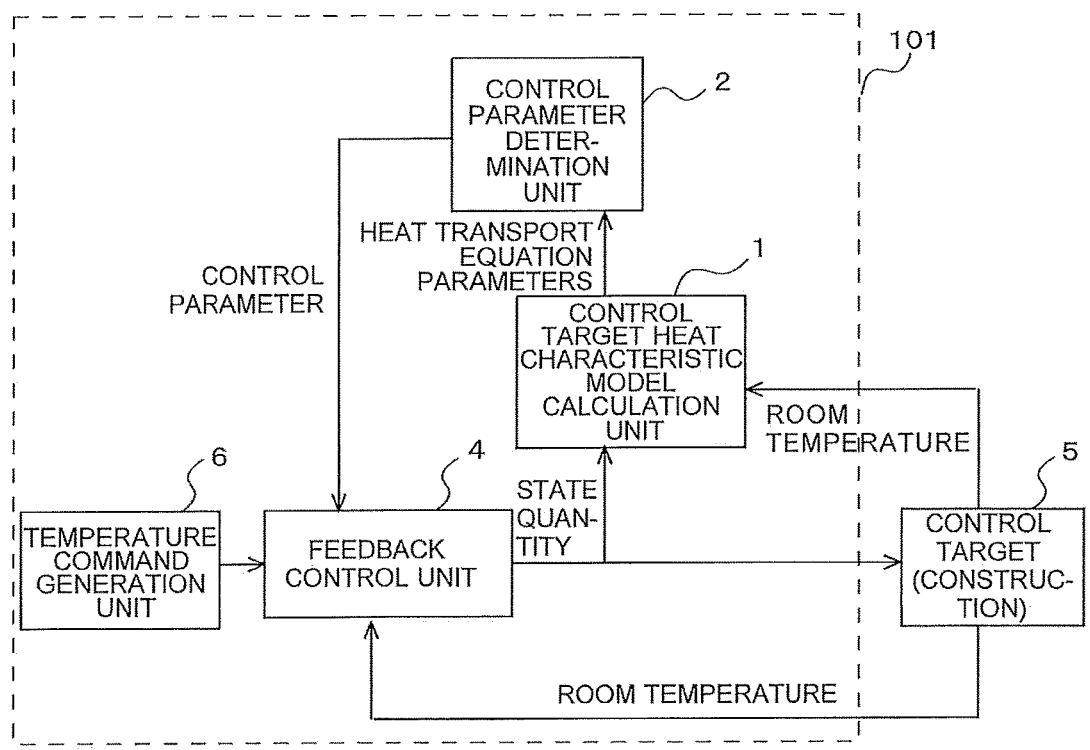
FIG. 11 is a block diagram of a controller of an air-conditioning system according to Embodiment 2 of the present invention.
Figure 12:
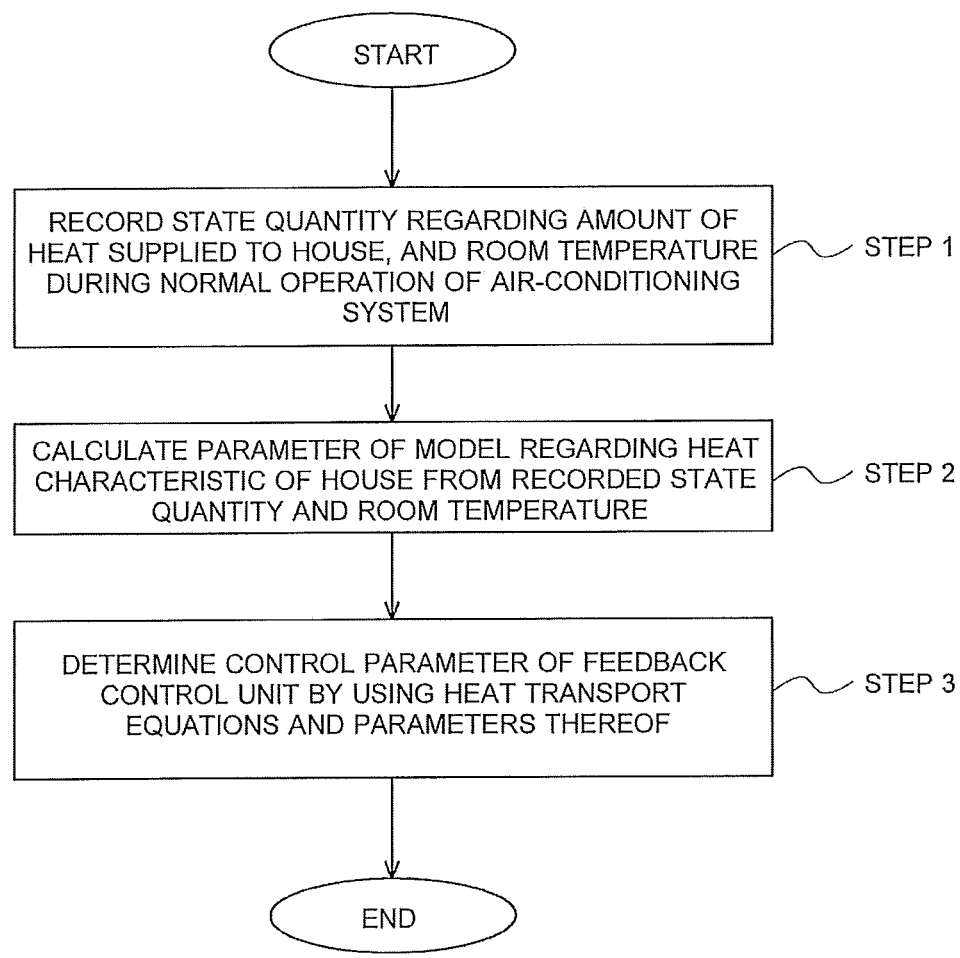
FIG. 12 is a parameter determination flowchart of a feedback control unit of the controller of the air-conditioning system according to Embodiment 2 of the present invention.

FIG. 11 is a block diagram of a controller 101 of an air-conditioning system according to Embodiment 2 of the present invention, and FIG. 12 is a parameter determination flowchart of the feedback control unit 4 of the controller 101 of the air-conditioning system according to Embodiment 2 of the present invention.

Embodiment 2 is different from Embodiment 1 in that the external environment measurement unit 3 is not included, and the outdoor air temperature and the amount of solar radiation, which are disturbances, are not used for parameter calculation of the control target heat characteristic model calculation unit 1.

Hereinafter, parameter determination flow of the feedback control unit 4 will be described with reference to FIG. 12.

First, a process in step 1 is performed, and during normal operation of the air-conditioning system, the state quantity regarding the amount of heat supplied to the house and the room temperature are recorded in the control target heat characteristic model calculation unit 1 every moment.

Next, a process in step 2 is performed, and the parameters of the control target heat characteristic model 8 are calculated by the control target heat characteristic model calculation unit 1 from the recorded state quantity regarding the amount of heat supplied to the house and the measured room temperature.

Heat generated by equipment and human body is previously recorded within the control target heat characteristic model calculation unit 1 as a standard value for each house. In addition, the amount of solar radiation is regarded as 0 and neglected.

Regarding the outdoor air temperature, the outdoor air temperature is assumed to agree with the initial value of the room temperature recorded in step 2, and the parameters composed of $R_1$, $R_2$, $R_z$, $C_1$, $C_2$, $C_z$, $\alpha$, $\beta$, $\gamma$, and $\delta$ or a combination thereof are calculated similarly to Embodiment 1. $\alpha$ and $\beta$ are regarded as 0 since solar radiation is neglected.

Next, the control parameter determination unit 2 performs a process in step 3. First, the control parameter determination unit 2 calculates a transfer function F1(S) from the amount of heat $Q_{HVAC}$ supplied from the air-conditioning system to the house to the room temperature $T_z$, by using the above heat transport equations (1) to (3) and the heat transport equation parameters calculated by the control target heat characteristic model calculation unit 1.

The simulator shown in FIG. 7 using the transfer functions of the control target heat characteristic model 8 shown in FIG. 6 is incorporated in the control parameter determination unit 2, and F1(S) is used as the heat characteristic model in FIG. 7.

In the simulator, simulation in which a stepwise target command and a stepwise disturbance are applied as shown in FIG. 8 is performed for each combination of the control parameter, while the value of the control parameter of the feedback control unit 4 is changed according to a predetermined rule.

In the simulation performed for each combination, the time $T_a$ taken until initially reaching the target value when the target command changes stepwise as shown in FIG. 8, and the maximum overshoot amount $K_a$ are calculated, and a combination of the control parameter that provides a minimum weighted sum of $T_a$, and $K_a$ is selected as a candidate of the parameter. The time $T_c$ taken until falling into a specified error range when the target command changes stepwise may be used instead of $T_a$.

The value of the selected control parameter is multiplied by a correction coefficient and then sent to the feedback control unit 4. In the feedback control unit 4, if update of the control parameter is designated by an operator or another person, the control parameter is updated with the value sent from the control parameter determination unit 2 when the controller 101 of the air-conditioning system is turned on again after being turned off.

The control parameter may be changed to the sent value by using a moving average filter having a previously designated window length.

Due to the above, according to Embodiment 2, information about the outdoor air temperature and solar radiation is not used, so that there is an effect that it is possible to determine the control parameter even without measuring external environment information.

Embodiment 3

Hereinafter, Embodiment 3 will be described. The description of the same parts as in Embodiment 1 is omitted, and parts that are the same as or correspond to those in Embodiment 1 are designated by the same reference signs.

Figure 13:
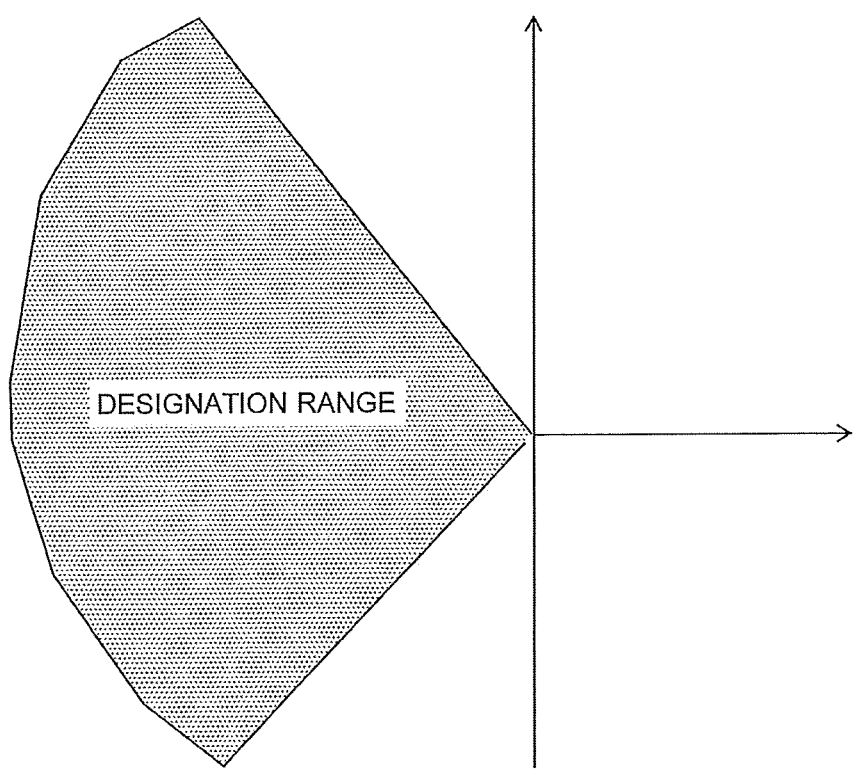
FIG. 13 is a diagram showing an example of a designation range of a pole arrangement of a controller of an air-conditioning system according to Embodiment 3 of the present invention.

FIG. 13 is a diagram showing an example of a designation range of a pole arrangement of a controller of an air-conditioning system according to Embodiment 3 of the present invention.

Embodiment 3 is different from Embodiment 1 only in the control parameter determination method in the control parameter determination unit 2.

In the control parameter determination unit 2, a transfer function of a closed loop composed of the feedback control unit 4 and the control target heat characteristic model 8 shown in the block diagram of FIG. 7 in the case of using F1(S) as a heat characteristic model is defined as G1(S), and a pole of G1(S) is calculated while the value of the control parameter of the feedback control unit 4 is changed according to a predetermined rule. Then, at the calculated pole of G1(S), within the designation range shown in FIG. 13, a value of the control parameter with which a pole closest to the origin is away from the origin is selected. The selected value of the control parameter is multiplied by a predetermined correction coefficient and sent to the feedback control unit 4.

Due to the above, according to Embodiment 3, the control parameter of the feedback control unit 4 is determined on the basis of the position of the pole of the transfer function, so that there is an effect that it is possible to shorten the time taken until the control parameter of the feedback control unit 4 is calculated after the parameters of the control target heat characteristic model 8 are calculated.

Embodiment 4

Hereinafter, Embodiment 4 will be described. The description of the same parts as in Embodiment 1 is omitted, and parts that are the same as or correspond to those in Embodiment 1 are designated by the same reference signs.

Embodiment 4 is different from Embodiment 1 only in the control parameter determination method in the control parameter determination unit 2.

In the control parameter determination unit 2, a transfer function of a closed loop composed of the feedback control unit 4 and the control target heat characteristic model 8 shown in the block diagram of FIG. 7 in the case of using F1(S) as a heat characteristic model is defined as G1(S), and the control parameter is determined such that a coefficient of a denominator polynomial of G1(S) is a predetermined ratio.

When the denominator polynomial of G1(S) is

[Math. 4]

$$G1(S) = a_n \times s^n + \ldots a_1 \times s + a_0 \qquad (4),$$

in the case where

[Math. 5]

$$Pi = a_i^2 / (a_{i+1} \times a_{i-1}) (i=1,2, \ldots n) \qquad (5)$$

[Math. 6]

$$\tau = a_1 / a_0 \qquad (6)$$

is regarded as

[Math. 7]

$$Pi = 2.5, 2, 2, \ldots \qquad (7)$$

and the temperature command changes stepwise, when a target value of a time taken until the room temperature reaches the target value that changes stepwise is $T_c$, the control parameter of the feedback control unit 4 is determined such that $\tau$ is

[Math. 8]

$$\tau = 0.5 \times Tc \qquad (8)$$

The values of the formula (7) and the formula (8) are not limited to 2.5, 2, 0.5, etc., and may be other values such as 2.3, 1.8, and 0.4.

Due to the above, according to Embodiment 4, the control parameter of the feedback control unit 4 is determined from the ratio of the coefficient of the denominator of the transfer function, so that there is an effect that it is possible to shorten the time taken until the control parameter of the feedback control unit 4 is calculated after the parameters of the control target heat characteristic model 8 are calculated.

Embodiment 5

Hereinafter, Embodiment 5 will be described. The description of the same parts as in Embodiment 1 is omitted, and parts that are the same as or correspond to those in Embodiment 1 are designated by the same reference signs.

Figure 14:
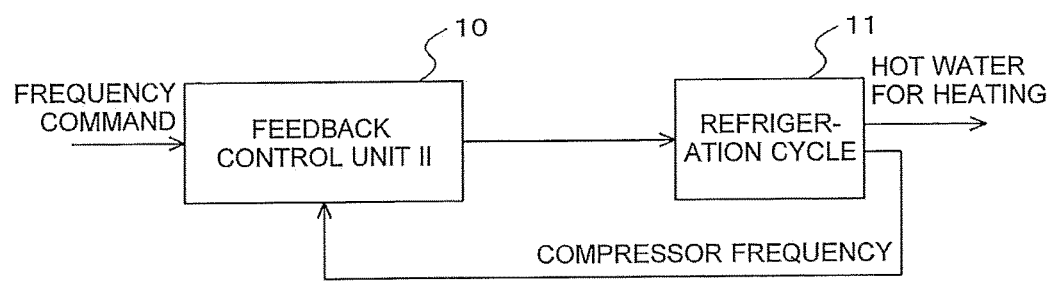
FIG. 14 is a block diagram of a state quantity control unit of a feedback control unit of a controller of an air-conditioning system according to Embodiment 5 of the present invention.

FIG. 14 is a block diagram of the state quantity control unit 13 of the feedback control unit 4 of a controller of an air-conditioning system according to Embodiment 5 of the present invention.

In Embodiment 1, the hot water temperature command is taken as an example of the state quantity command within the feedback control unit 4. In Embodiment 5, a frequency command for a compressor of the refrigeration cycle 11 is used as the state quantity command, and the state quantity control unit 13 within the feedback control unit 4 in FIG. 2 controls the frequency of the compressor as shown in FIG. 14. In Embodiment 5, the frequency of the compressor is used as the state quantity regarding the amount of heat supplied to the house and the amount of heat $Q_{HVAC}$ supplied from the air-conditioning system to the house.

Instead of the frequency of the compressor, the frequency command for the compressor may be used.

Due to the above, according to Embodiment 5, the parameters of the control target heat characteristic model 8 are calculated by using the frequency of the compressor, so that there is an effect that it is possible to determine the control parameter even when there is an error in a measured value of the hot water temperature.

Embodiment 6

Hereinafter, Embodiment 6 will be described. The description of the same parts as in Embodiment 1 is omitted, and parts that are the same as or correspond to those in Embodiment 1 are designated by the same reference signs.

Figure 15:
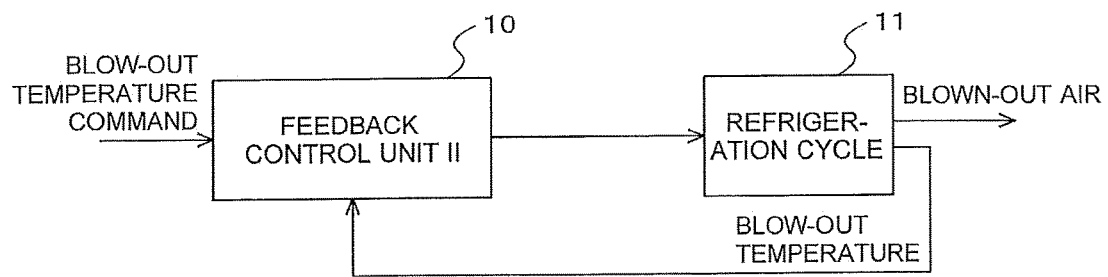
FIG. 15 is a block diagram of a state quantity control unit of a feedback control unit of a controller of an air-conditioning system according to Embodiment 6 of the present invention.

FIG. 15 is a block diagram of the state quantity control unit 13 of the feedback control unit 4 of a controller of an air-conditioning system according to Embodiment 6 of the present invention.

Embodiment 1 has been described with the ATW system in which hot water is generated by a heat pump, sent to a place to be heated, and heating is performed by using a heat radiating device such as a radiator or a fan coil. Embodiment 6 is described with a duct air-conditioning system that performs whole-building air-conditioning by sending warm air or cold air to a duct running over each room. In the duct air-conditioning system which performs whole-building air-conditioning, the state quantity command within the feedback control unit 4 in FIG. 2 is a blown-out temperature command in FIG. 15, and the state quantity control unit 13 in FIG. 2 is illustrated in detail in FIG. 15.

In Embodiment 6, a blow-out temperature of air blown out to the duct is used as the state quantity regarding the amount of heat supplied to the house and the amount of heat $Q_{HVAC}$ supplied from the air-conditioning system to the house. In the case where the air speed of the air blown out to the duct is made variable by a fan, the state quantity regarding the amount of heat supplied to the house is the blow-out temperature and the air speed, and the amount of heat $Q_{HVAC}$ supplied from the air-conditioning system to the house is blow-out temperature×air speed.

Due to the above, according to Embodiment 6, the heat transport equation parameters of the control target heat characteristic model 8 are calculated on the basis of the blow-out temperature of the air blown out to the duct of the duct air-conditioning system which performs whole-building air-conditioning, so that there is an effect that it is possible to determine the control parameter of the feedback control unit 4 of the duct air-conditioning system which cools or heats the whole building through the duct, without dedicated operation.

Embodiment 7

Hereinafter, Embodiment 7 will be described. The description of the same parts as in Embodiment 1 is omitted, and parts that are the same as or correspond to those in Embodiment 1 are designated by the same reference signs.

Embodiment 1 has been described with the ATW system in which hot water is generated by a heat pump, sent to a place to be heated, and heating is performed by using a heat radiating device such as a radiator or a fan coil. Embodiment 7 is described with an individual air-conditioning system for each room in which a room air-conditioning device is mounted at each of some of the rooms of the house.

In the individual air-conditioning system for each room, the state quantity command within the feedback control unit 4 in FIG. 2 is a blown-out temperature command in FIG. 15, and the state quantity control unit 13 in FIG. 2 is illustrated in detail in FIG. 15. In Embodiment 7, a blow-out temperature of air blown out to each room is used as the state quantity regarding the amount of heat supplied to the house and the amount of heat $Q_{HVAC}$ supplied from the air-conditioning system to the house. In the case where the air speed of the blown-out air is made variable by a fan, the state quantity regarding the amount of heat supplied to the house is the blow-out temperature and the air speed, and the amount of heat $Q_{HVAC}$ supplied from the air-conditioning system to the house is blow-out temperature×air speed.

The heat transport equations which are the formulas (1) to (3) are formulas for each room at which the air-conditioning system is mounted, the control target heat characteristic model 8 in FIGS. 5, 9, and 10 is a model for each room at which the air-conditioning system is mounted, and a heat characteristic model for each room at which the air-conditioning system is mounted is calculated in the control target heat characteristic model calculation unit 1.

Due to the above, according to Embodiment 7, there is an effect that it is possible to determine the control parameter of the feedback control unit 4 of the air-conditioning system mounted at each room, without dedicated operation.

Embodiment 8

Hereinafter, Embodiment 8 will be described. The description of the same parts as in Embodiment 1 is omitted, and parts that are the same as or correspond to those in Embodiment 1 are designated by the same reference signs.

Figure 16:
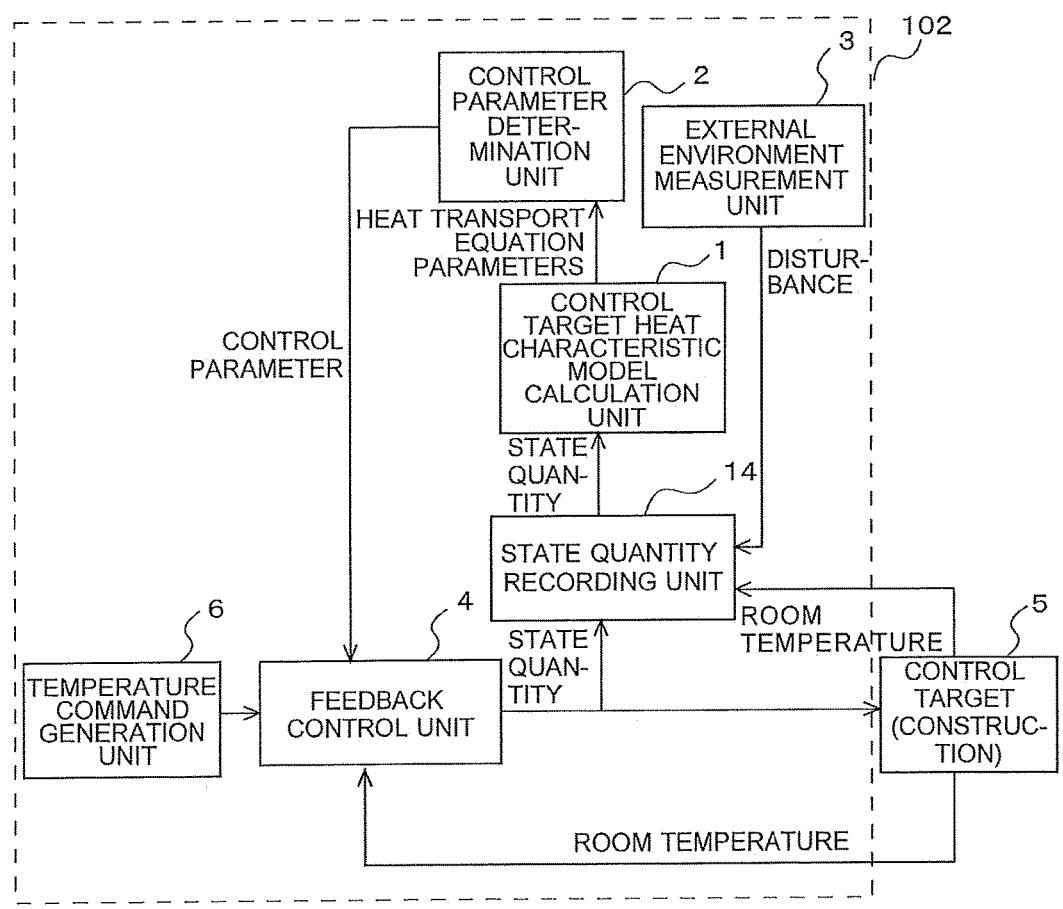
FIG. 16 is a block diagram of a controller of an air-conditioning system according to Embodiment 8 of the present invention.

FIG. 16 is a block diagram of a controller 102 of an air-conditioning system according to Embodiment 8 of the present invention.

Embodiment 8 is different from Embodiment 1 in that a state quantity recording unit 14 is provided outside the control target heat characteristic model calculation unit 1 as shown in FIG. 16.

In Embodiment 1, the feedback control unit 4, the control target heat characteristic model calculation unit 1, and the control parameter determination unit 2 in FIG. 1 are incorporated in a controller dedicated for the air-conditioning system. Meanwhile, in Embodiment 8, the feedback control unit 4 and the state quantity recording unit 14 are incorporated in a controller dedicated for the air-conditioning system, and the control target heat characteristic model calculation unit 1 and the control parameter determination unit 2 are incorporated in a personal computer that is connected only at the time of control parameter determination.

Then, during normal operation of the air-conditioning system, the state quantity regarding the amount of heat supplied to the house, the room temperature, the outdoor air temperature, and the amount of solar radiation are recorded in the state quantity recording unit 14 every moment, and the state quantity regarding the amount of heat supplied to the house, the room temperature, the outdoor air temperature, and the amount of solar radiation that are recorded at the time of control parameter determination are sent to the control target heat characteristic model calculation unit 1.

Due to the above, according to Embodiment 8, the control target heat characteristic model calculation unit 1 and the control parameter determination unit 2 are incorporated in the personal computer that is connected only at the time of control parameter determination, so that there is an effect that it is possible to reduce the size of a program of the controller dedicated for the air-conditioning system.

Embodiment 9

Hereinafter, Embodiment 9 will be described. The description of the same parts as in Embodiment 1 is omitted, and parts that are the same as or correspond to those in Embodiment 1 are designated by the same reference signs.

Embodiment 9 is different from Embodiment 1 in that the hot water temperature command shown in FIG. 3 is used as the state quantity regarding the amount of heat supplied to the house, instead of the hot water temperature.

Due to the above, according to Embodiment 9, the control parameter of the feedback control unit 4 is determined by using the hot water temperature command, not by using the hot water temperature, so that it is possible to calculate the heat transport equation parameters of the control target heat characteristic model 8 with high accuracy even when there is an error in a measured value of the hot water temperature or when noise is included therein, and there is an effect that it is possible to determine the control parameter of the air-conditioning system without dedicated operation.

Embodiment 10

Hereinafter, Embodiment 10 will be described. The description of the same parts as in Embodiment 1 is omitted, and parts that are the same as or correspond to those in Embodiment 1 are designated by the same reference signs.

Figure 17:
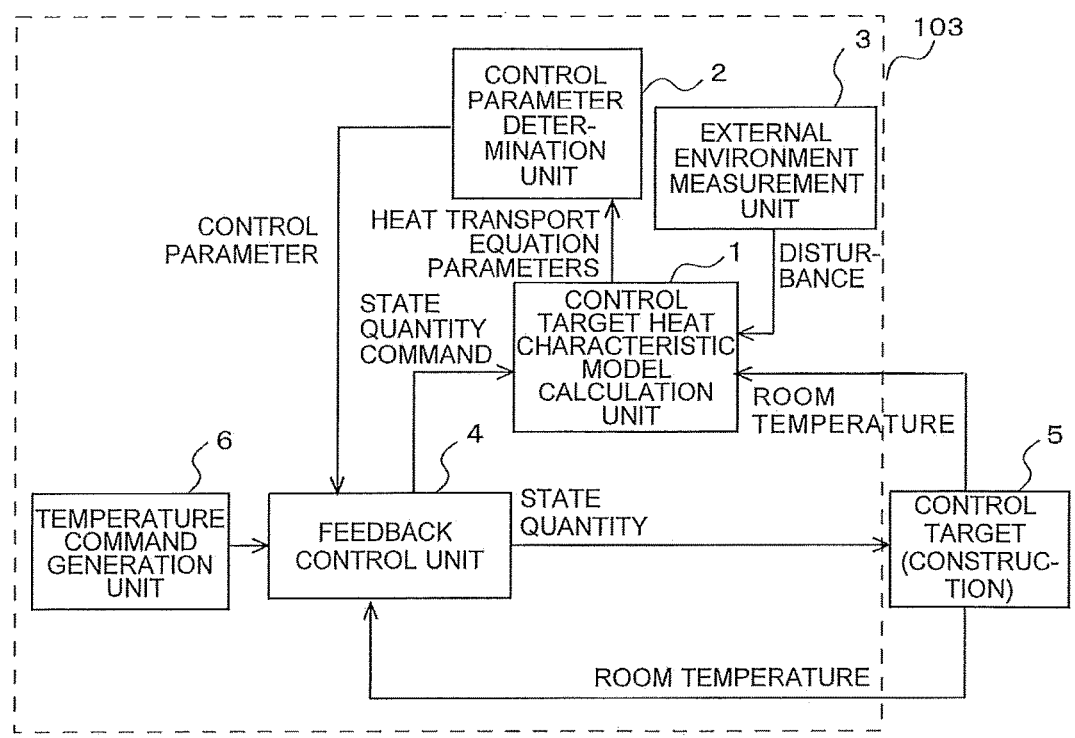
FIG. 17 is a block diagram of a controller of an air-conditioning system according to Embodiment 10 of the present invention.

FIG. 17 is a block diagram of a controller 103 of an air-conditioning system according to Embodiment 10 of the present invention.

Embodiment 10 is different from Embodiment 1 in that, as shown in FIG. 17, a parameter inputted to the control target heat characteristic model calculation unit 1 is not the state quantity regarding the amount of heat supplied to the house, which is the control target 5, and is a target value (state quantity command) of the state quantity regarding the amount of heat supplied to the house, which is the control target 5.

As shown in FIG. 17, target values (state quantity commands) of the hot water temperature and the flow rate each of which is the state quantity regarding the amount of heat supplied to the house, which is the control target 5, the room temperature within the house, and the outdoor air temperature and the amount of solar radiation which are disturbances measured by the external environment measurement unit 3, are inputted to the control target heat characteristic model calculation unit 1.

When the flow rate of hot water sent to the inside of the house in the ATW system is uniform, the state quantity regarding the amount of heat supplied to the house may be only the hot water temperature.

The heat transport equation parameters are calculated on the basis of each of the above inputted values, and are outputted to the control parameter determination unit 2. In addition, the heat transport equation parameters correspond to a "parameter of a model regarding a heat characteristic of a control target" of the present invention.

Due to the above, according to Embodiment 10, there is an effect that it is possible to calculate the heat transport equation parameters of the control target heat characteristic model 8 with high accuracy even when noise or the like is included in a measured value of the state quantity regarding the amount of heat supplied to the construction.

REFERENCE SIGNS LIST 1 control target heat characteristic model calculation unit 2 control parameter determination unit 3 external environment measurement unit 4 feedback control unit 5 control target 6 temperature command generation unit 7 target command generation unit 8 control target heat characteristic model 9 disturbance generation unit 10 feedback control unit II 11 refrigeration cycle 12 PID control unit 13 state quantity control unit 14 state quantity recording unit 100 controller 101 controller 102 controller 103 controller

The invention claimed is:

1. A controller of an air-conditioning system, comprising:
controller circuitry configured to perform,
a feedback control unit configured to generate a state quantity command from a control parameter for feedback control and a difference between a target value of a room temperature and a measured room temperature and control the room temperature to the target value based on the state quantity command;
a control target heat characteristic model calculation unit configured to, calculate, during normal operation, a parameter of a model regarding a heat characteristic of a control target from at least one of a state quantity regarding an amount of heat supplied to the control target and the state quantity command, and the measured room temperature; and
a control parameter determination unit configured to determine the control parameter by using the parameter of the model regarding the heat characteristic of the control target and a formula representing the model regarding the heat characteristic of the control target,
wherein the model is a thermal network model based on heat generated by equipment and one or more human bodies recorded within the control target, and
the controller circuitry continuously controlling the room temperature to the target value to maintain comfort to the one or more human bodies.

2. The controller of the air-conditioning system of claim 1, wherein a state quantity regarding a hot water temperature is used as the state quantity regarding the amount of heat supplied to the control target.

3. The controller of the air-conditioning system of claim 1, wherein
the air-conditioning system includes a duct, and
a state quantity regarding a blow-out temperature of air blown out to the duct is used as the state quantity regarding the amount of heat supplied to the control target.

4. The controller of the air-conditioning system of claim 1, further comprising a compressor, wherein
a state quantity regarding a frequency of the compressor is used as the state quantity regarding the amount of heat supplied to the control target.

5. The controller of the air-conditioning system of claim 1, wherein the control parameter determination unit is provided with a simulator using a transfer function, and is configured to
perform a simulation for each combination of the control parameter while changing a value of the control parameter according to a predetermined rule, and
determine the control parameter based on a result of the simulation.

6. The controller of the air-conditioning system of claim 1, wherein the control parameter determination unit is configured to calculate a pole of a transfer function of a closed loop composed of the feedback control unit and the control target heat characteristic model calculation unit, while changing a value of the control parameter according to a predetermined rule, and determine the control parameter based on a position of the calculated pole.

7. The controller of the air-conditioning system of claim 1, wherein the control parameter determination unit is configured to determine the control parameter based on a ratio of a coefficient of a denominator of a transfer function of a closed loop composed of the feedback control unit and the control target heat characteristic model calculation unit.

8. The controller of the air-conditioning system of claim 1, wherein the control target heat characteristic model calculation unit is configured to calculate the parameter from a disturbance in addition to the state quantity regarding the amount of heat supplied to the control target and the measured room temperature.

9. A method for controlling an air-conditioning system, the method comprising:

generating a state quantity command from a control parameter for feedback control and a difference between a target value of a room temperature and a measured room temperature and control the room temperature to the target value based on the state quantity command;

calculating during normal operation a parameter of a model regarding a heat characteristic of a control target from at least a state quantity regarding an amount of heat supplied to the control target and a measured room temperature;

determining a control parameter for feedback control by a feedback control unit configured to control a room temperature to a target value, by a control parameter determination unit using the parameter of the model regarding the heat characteristic and a formula of the model regarding the heat characteristic of the control target, the model being a thermal network model based on heat generated by equipment and one or more human bodies recorded within the control target, and continuously controlling the room temperature to the target value to maintain comfort to the one or more human bodies.

10. The controller of the air-conditioning system of claim 1, wherein the formula representing the model regarding the heat characteristic of the control target is a heat transport equation and the parameter of the model regarding the heat characteristic of the control target is a heat transport equation parameter, and wherein the control parameter determination unit is configured to determine the control parameter by using a transfer function determined by using the heat transport equation and the heat transport equation parameter.

11. The controller of the air-conditioning system of claim 5, wherein the control parameter is calculated by multiplying a control parameter in which a weighted sum of a time $T_a$ taken, for a normal temperature to initially reach a target value when a target command changes stepwise, a maximum overshoot amount $K_a$ of the normal temperature when the target command changes stepwise, a time $T_b$ taken for the normal temperature to fall into a specified error range when a stepwise disturbance is applied, and a maximum overshoot amount $K_b$ of the normal temperature when the stepwise disturbance is applied is minimum by a predetermined correction coefficient.

* * * * *